Dec. 22, 1925.
G. M. STEVENS
1,566,704
RUBBER FRICTION DRIVE RING
Filed Sept. 17, 1924
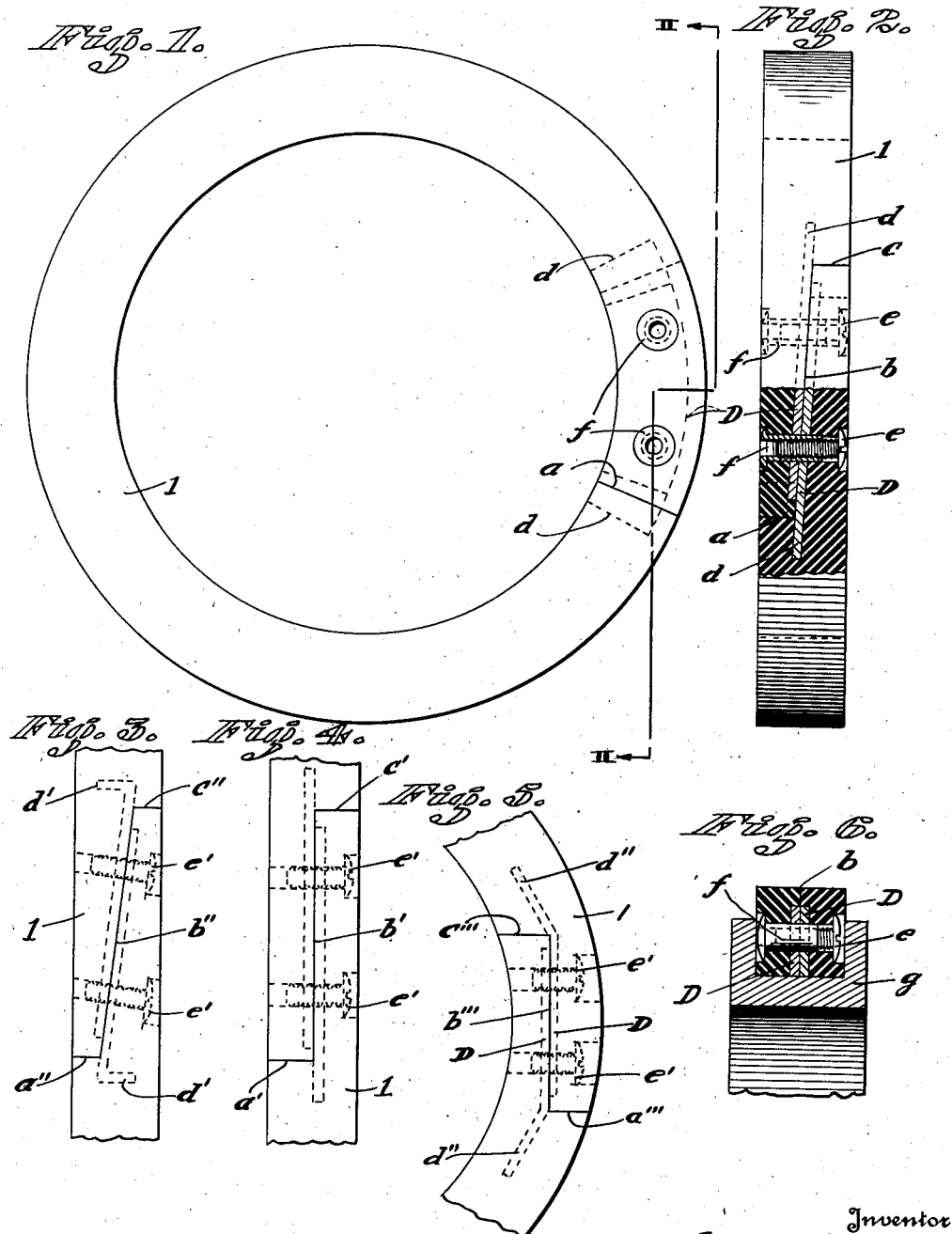

Patented Dec. 22, 1925.

1,566,704

UNITED STATES PATENT OFFICE.

GEORGE M. STEVENS, OF SAN FRANCISCO, CALIFORNIA, ASSIGNOR OF ONE-THIRD TO JOHN C. BALLETTI AND ONE-THIRD TO WILLIAM C. ANDERSON, BOTH OF SAN FRANCISCO, CALIFORNIA.

RUBBER FRICTION DRIVE RING.

Application filed September 17, 1924. Serial No. 738,317.

*To all whom it may concern:*

Be it known that I, GEORGE M. STEVENS, a citizen of the United States, and a resident of San Francisco, county of San Francisco, State of California, have invented a new and useful Rubber Friction Drive Ring, of which the following is a specification.

This invention relates to friction driving wheels or disks in general and in particular to a rubber drive ring as used on certain can making machinery and known to the trade as a "slitter ring", This ring is used as a friction drive disk and ordinarily consists of a solid soft rubber ring positioned in the groove of a flange on the machine and making it necessary in replacing the rings to strip the shaft or remove it from its bearings, and the object of my invention is to provide a rubber slitter ring having a special split joint whereby the rubber ring may be renewed easily and quickly without stripping the shaft.

In the drawings accompanying this application, I show several modifications of the split joint applied to a slitter ring all embracing the same principles which make my ring a demonstrated success in regular use on a number of machines.

Figures 1 and 2 show respectively in plan and edge views my preferred construction using a pair of threaded sleeves and screws for fastening the joint, Figures 3 and 4 show modifications in the angularity of the joint using common screws, Figure 5 shows the joint applied on the side of the ring instead of the edge and Figure 6 is a cross section of the ring at the joint constructed as in Figure 1 and seated in place in the grooved flange of the machine.

In the figures 1 is a soft resilient rubber ring with a stepped split joint so that the ring may be opened up.

The joint in Figures 1 and 2 is formed along the lines $a$—$b$—$c$, the line $b$ being substantially parallel to the side of the ring.

In Figure 4 the joint $a'$—$b'$—$c'$ is shown with the line $b'$ exactly parallel, and in Figure 3 the joint $a''$—$b''$—$c''$, the line $b''$ is at a decided angle to the sides of the ring, whereas in Figure 5 the joint $a'''$— $b'''$—$c'''$ is shown applied to the side of the ring.

On opposite ends of the rubber ring forming the joint are metal plates vulcanized into the rubber. These plates in all figures are designated D and are placed in the rubber at the joint surface so that when the joint is closed, the plates will lie against one another and are so secured by suitable screws.

The plates extend into the solid part of the ring beyond the joint, as shown at $d$, and in Figure 3 the extending ends are bent at an angle, as shown at $d'$ to hook into the rubber, while in Figure 5 the extending ends $d''$ are bent but slightly to follow the direction of the ring, and in all views the plates are shown as terminating just short of the ends of the ring to which they are respectively vulcanized.

To secure the joint, I preferably used threaded screws $e$ passing into threaded sleeve $f$ as shown in Figure 2 wherein the joint is partly shown in section along the line 2—2 of Figure 1.

Countersunk holes are formed in both ends of the ring joint extending through both metal plates of a size to pass the threaded sleeves as shown, so that when the joint is tightened by the screws, the strain is taken entirely by the metal plates against the sleeves, and when the ring is joined and sprung into the grooved flange $g$ of the machine, as shown in Figure 6, the screws are confined by the flange walls against working loose.

It should also be noted in this view that the plates are set below the outer diameter of the rubber ring to provide a large amount of rubber, as indicated at $h$, to take the wear of the drive.

In place of the threaded sleeves, plain screws may be used as shown in Figures 3, 4 and 5 at $e'$.

Having thus described my invention, it should be noted that it is not merely a split collar of the common type, but it is a split soft rubber ring with a special reinforced joint preventing the joint from opening up at this point of weakness, and also the re- inforcement is placed in a position overcoming interference with frictional driving periphery of the ring, and furthermore the position of the locking screws form a cooperating combination with the flanges of the machine which overcomes any possibility of the joint coming apart.

I claim:

1. A soft rubber drive ring of the character described provided with a split joint, said joint comprising overlapping ends with a reinforcing plate vulcanized to each end arranged for bolting together, and the plate on each end extending beyond the overlapping of the joint into the solid body of the ring.

2. A soft rubber drive ring of the character described provided with a split joint, said joint comprising overlapping ends with a reinforcing plate vulcanized to each end arranged for bolting together, and the plate on each end extending beyond the overlapping of the joint into the solid body of the ring, and terminating short of the extreme end to which it is vulcanized.

3. A split ring of the character described comprised of soft rubber with an overlapping joint, a reinforcement incorporated in the joint, a threaded sleeve extending from one side of the ring through the soft rubber and through the reinforcement and a screw extending from the other side of the ring through the soft rubber and engaging the threaded sleeve.

4. In combination a grooved machine element and a soft rubber friction drive ring provided with a split joint with overlapping ends, screws clamping the overlapping ends together, said ring adapted to be seated in the grooved machine element and constructed so that the sides of the groove extend beyond the screws whereby the screws are retained against displacement.

GEORGE M. STEVENS.